United States Patent [19]
Pfeiffer et al.

[11] Patent Number: 5,535,366
[45] Date of Patent: Jul. 9, 1996

[54] METHOD OF AND CIRCUIT ARRANGEMENT FOR FREEING COMMUNICATIONS RESOURCES, PARTICULARLY FOR USE BY A SWITCHING ELEMENT

[75] Inventors: Bodo Pfeiffer, Schwieberdingen; Thomas Banniza, Hemmingen; Bozo Cesar, Stuttgart; Stefan Wahl; Klaus-Dieter Menk, both of Hemmigen, all of Germany

[73] Assignee: Alcatel N. V., Amsterdam, Netherlands

[21] Appl. No.: 665,788

[22] Filed: Mar. 6, 1991

[30] Foreign Application Priority Data

Mar. 12, 1990 [DE] Germany ............ 40 07 747.0
Apr. 7, 1990 [DE] Germany ............ 40 11 357.4

[51] Int. Cl.⁶ .................................. G06F 13/00
[52] U.S. Cl. ............ 395/486; 395/478; 395/485; 395/487; 364/242.91; 364/246.12; 364/544.3; 364/DIG. 1
[58] Field of Search ............ 371/60, 60.1; 395/485, 395/486, 487, 478

[56] References Cited

U.S. PATENT DOCUMENTS

| | | | |
|---|---|---|---|
| 3,647,979 | 3/1972 | Rubin ............................. | 379/15 |
| 4,530,054 | 7/1985 | Hamstra et al. ................ | 364/200 |
| 4,630,259 | 12/1986 | Larson et al. .................. | 370/60 |
| 4,947,388 | 8/1990 | Kuwahara et al. ............. | 370/60 |
| 5,099,475 | 3/1992 | Kozaki et al. .................. | 370/60 |
| 5,130,984 | 7/1992 | Cisneros ......................... | 370/94.1 |
| 5,168,492 | 12/1992 | Beshai et al. .................. | 370/60.1 |
| 5,202,885 | 4/1993 | Schrodi et al. ................. | 370/94.1 |
| 5,214,639 | 5/1993 | Herion ............................ | 370/60 |
| 5,216,669 | 6/1993 | Hofstetter et al. ............. | 370/84 |

FOREIGN PATENT DOCUMENTS 3643767  12/1986  Germany.
8603085  5/1986  WIPO.

OTHER PUBLICATIONS

J. M. Cotton, et al., "ITT 1240 Digital Exchange Digital Switchin Network", Electrical Communication, vol. 56, No. 2/3, 1981.

H. M. Deitel; "An Introduction to Operating Systems" Addison-Wesley Publ. Co.; pp. 216–220; 1984.

D. Jäpel et al: "Communications for the Information Age"; IEEE Global Telecom. Conf. & Exhib.; vol. 3; pp. 54.2.1–54.2.7; 28 Nov.–1 Dec. '88.

Hj. Keller et al; "A Novel Memory Controller for an ATM Switch" 1990 Intern'l Zurich Sem. on Digital Commun.; pp. 103–114; 5–8 Mar. '90.

S–L Min et al; "A Timestamp-based Cache Coherence Scheme" Proc. 1989 Intern'l Conf. on Parallel Process'g; vol. 1, pp. I23–I32; 8 Aug. '89.

Primary Examiner—Tod R. Swann
Assistant Examiner—Frank J. Asta
Attorney, Agent, or Firm—Robbins, Berliner & Carson

[57] ABSTRACT

A buffer or other communications resource in, e.g., an ATM switch element receives random data which is then used by different data sinks. After the data has been outputted to the data sinks, the communications resource (e.g., the memory locations of the buffer) are released, i.e., labeled as free again. However, a resource which is not marked as free as a result of an error (whether erroneously the data is not retrieved or whether the release procedure is erroneous) remains blocked. To avoid permanent blockage of those memory locations whose contents have been in the buffer so long that they definitely (or at least very likely) should have been called for, information on the time of entry is stored together with the data. All memory locations are checked at regular intervals for the age of their contents. Upon attainment of a predetermined age, the location is labeled as free.

17 Claims, 14 Drawing Sheets

METHOD OF AND CIRCUIT ARRANGEMENT FOR FREEING COMMUNICATIONS RESOURCES, PARTICULARLY FOR USE BY A SWITCHING ELEMENT

TECHNICAL FIELD

The present invention relates to a method of managing like units as set forth in the preamble of claim 1, to a circuit arrangement as set forth in the preamble of claim 8, and to a switch element for an ATM system as set forth in the preamble of claim 18.

CLAIM FOR PRIORITY

This application is based on and claims priority from applications first filed in Germany under Application No. 40 07 747.0 and P40 11 357.4. To the extent such prior application may contain any additional information that might be of any assistance in the use and understanding of the invention claimed herein, it is hereby incorporated by reference.

Particularly for communication purposes, there is an increasing need for buffers which must store random data that are then called for by different data sinks. After the data has been output to the data sinks, the memory locations are released, i.e., labeled as free again.

As one of many examples, reference is made to a store-and-forward switching center for electronic mail service as is described in DE-OS 36 43 767.0. Information is received from different senders which then has to be distributed to different recipients. To reduce the total number of memories to a minimum, a central memory is employed. To make optimum use of the capacity of the transmission network, however, the information contained in the memory cannot be output in the order in which it was entered. This precludes the use of memories operating on the FIFO (first-in-first-out) principle.

If a location of this memory is not released because of an error (whether erroneously the call for data is not made or whether the release procedure is erroneous), this location will remain blocked for the remaining time of operation. Since the aim is to maintain uninterrupted service and since errors cannot be completely excluded, such a memory will be increasingly blocked unless additional steps are taken.

The same problem arises in other cases where a whole consisting of a plurality of like units is present and where a free unit is made available on request.

DISCLOSURE OF INVENTION

Besides a buffer with a plurality of memory blocks, such a whole may be, for example, a multiprocessor system or a multichannel communication system.

One example, with the aid of which the present invention will be explained in more detail, are ATM switch elements. The ATM switch element to be improved in accordance with the invention corresponds to an internal proposal.

The increasing variety of telecommunication services requires a highly flexible switching and transmission system. Fast packet-switching and packet-transmission systems, in particular, are being considered for this purpose. In such systems, data is transferred in the form of packets, called "cells". In the different services, cells belonging together follow one another at different intervals depending on the transmission capacity required. Such systems are characterized by an asynchronous mode of operation and a random traffic volume, even within the connection. For such a mode of operation, the term "Asynchronous Transfer Mode", ATM, is generally used.

It is the object of the invention to prevent permanent blocking.

This object is attained by a method according to the teaching of claim 1, a circuit arrangement according to the teaching of claim 8, and a switch element according to the teaching of claim 18.

Further advantageous features of the invention are defined in the subclaims.

BRIEF DESCRIPTION OF DRAWINGS

The invention will now be explained in more detail with the aid of two embodiments illustrated in the accompanying drawings, in which.

BEST MODE FOR CARRYING OUT THE INVENTION

Figure 1:
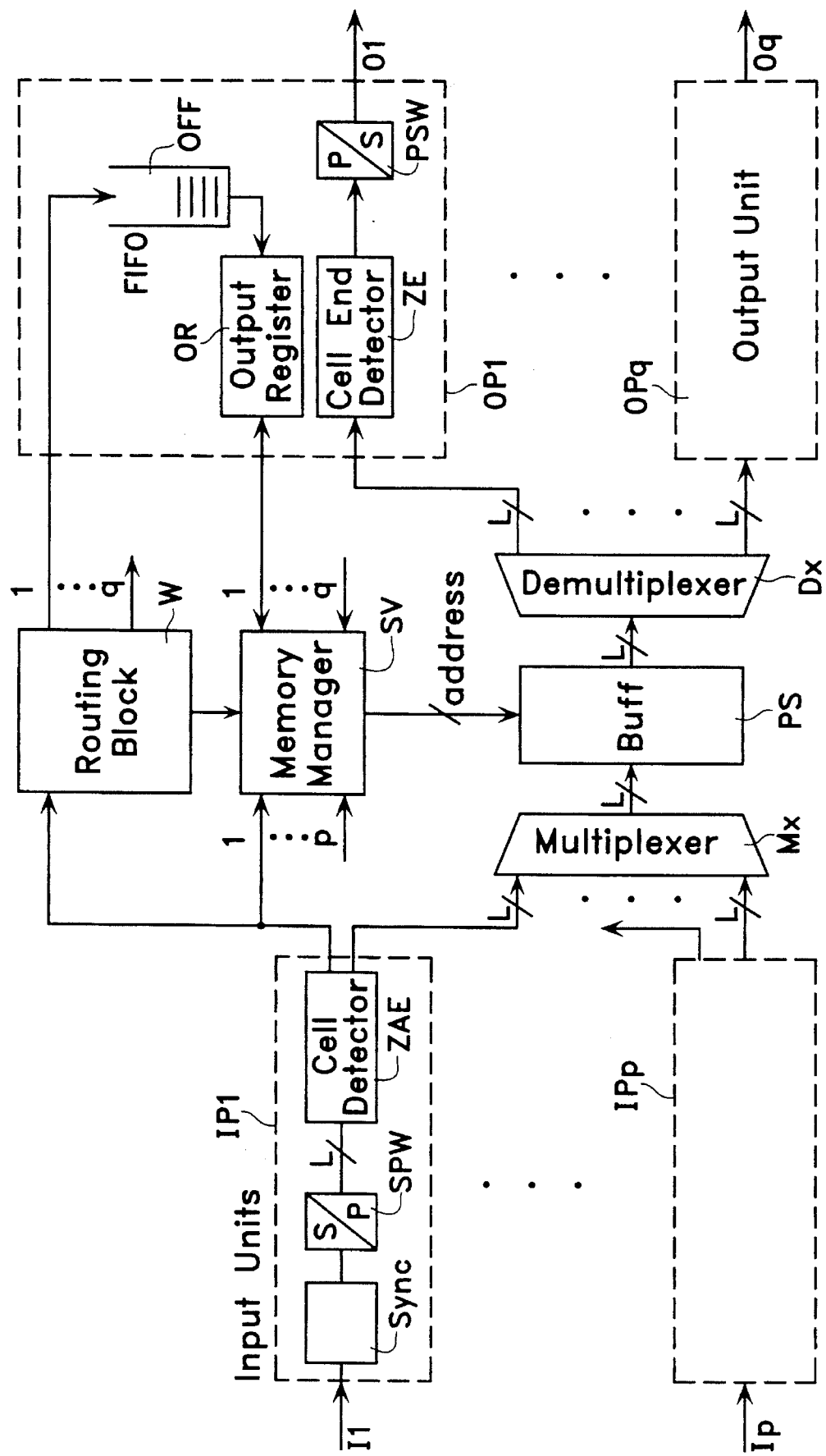
FIG. 1 is a simplified block diagram of a switch element according to the invention.
Figure 2:
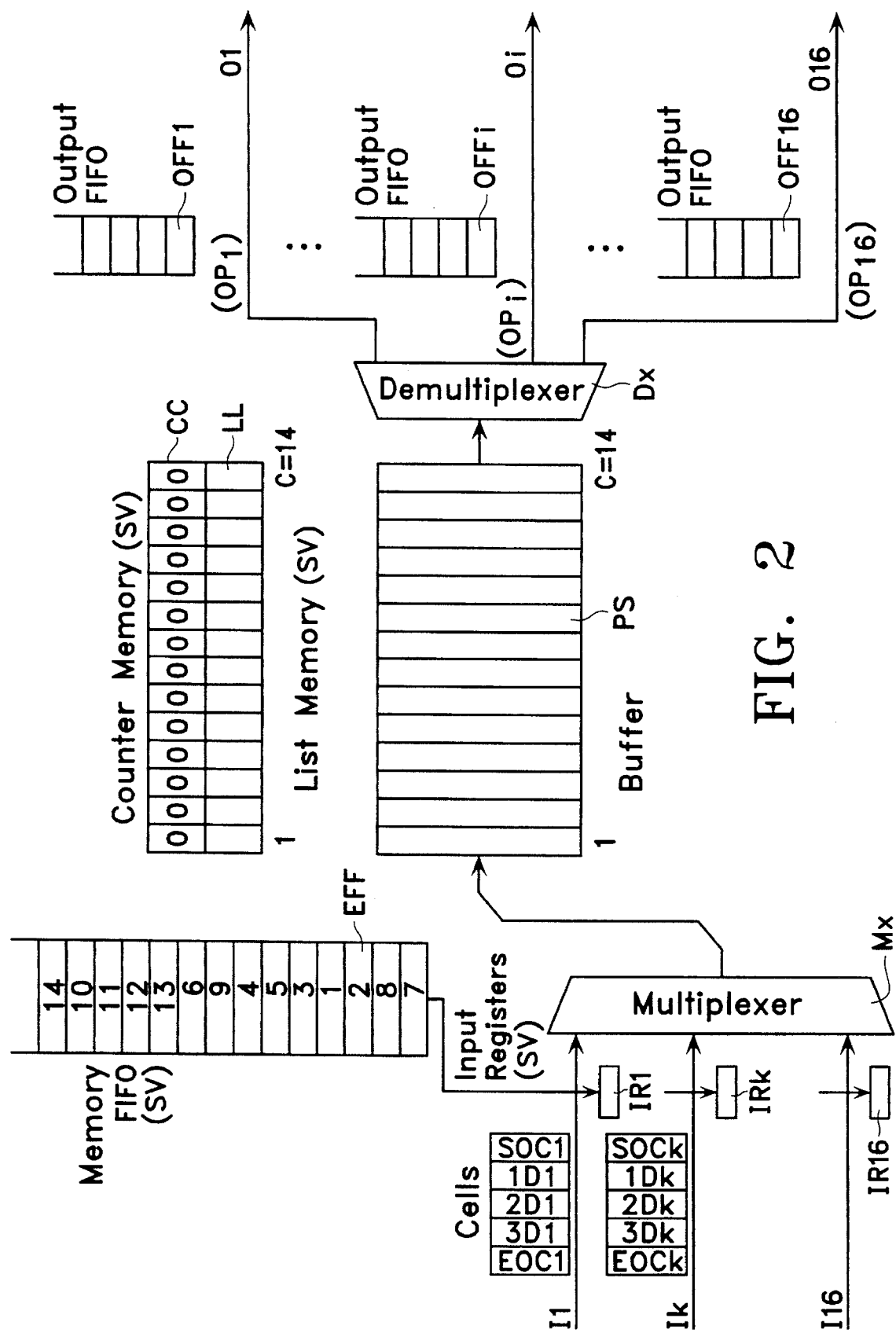
FIGS. 2 to 10 show the writing of cells into the buffer memory and the readout therefrom.
Figure 3:
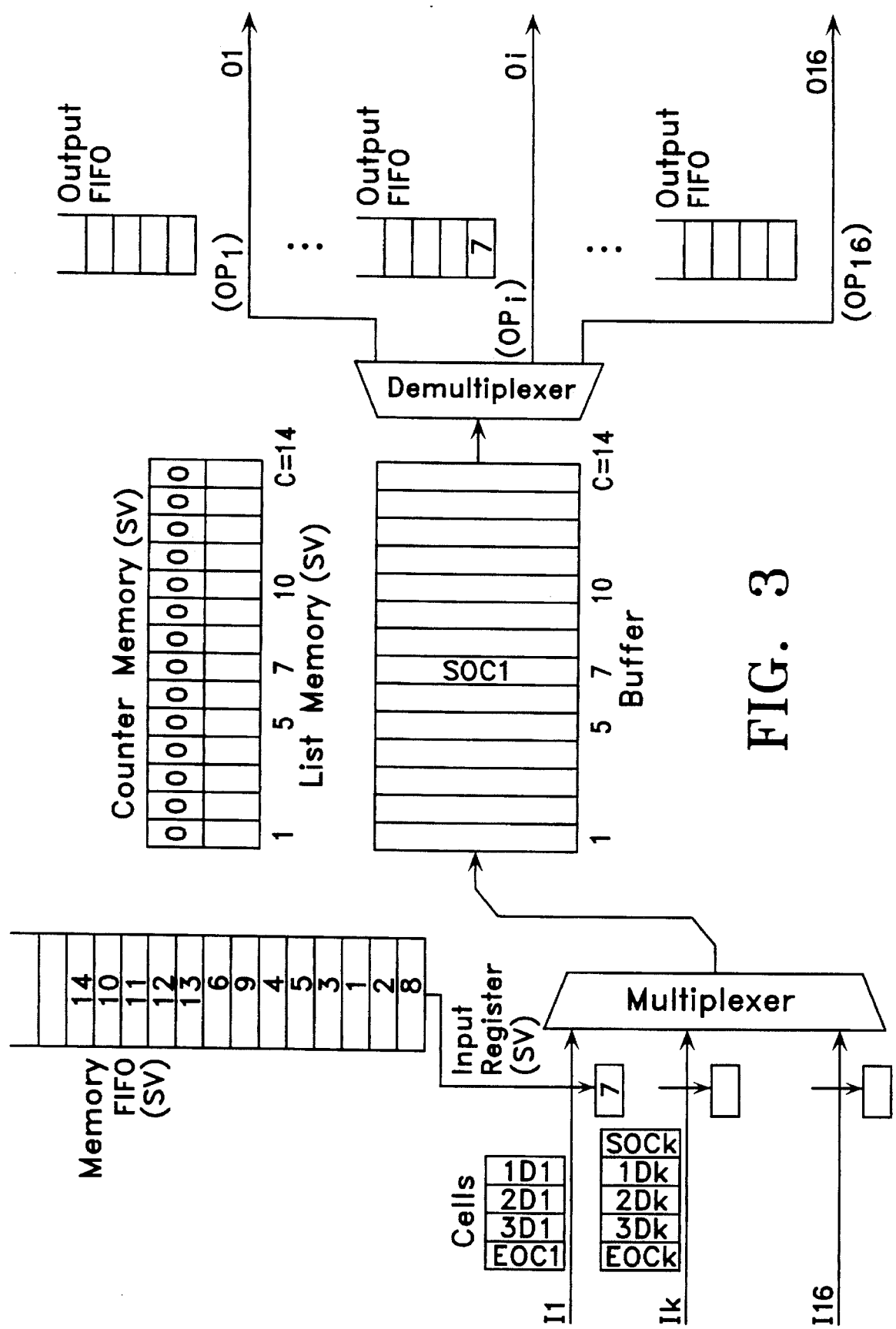
Figure 4:
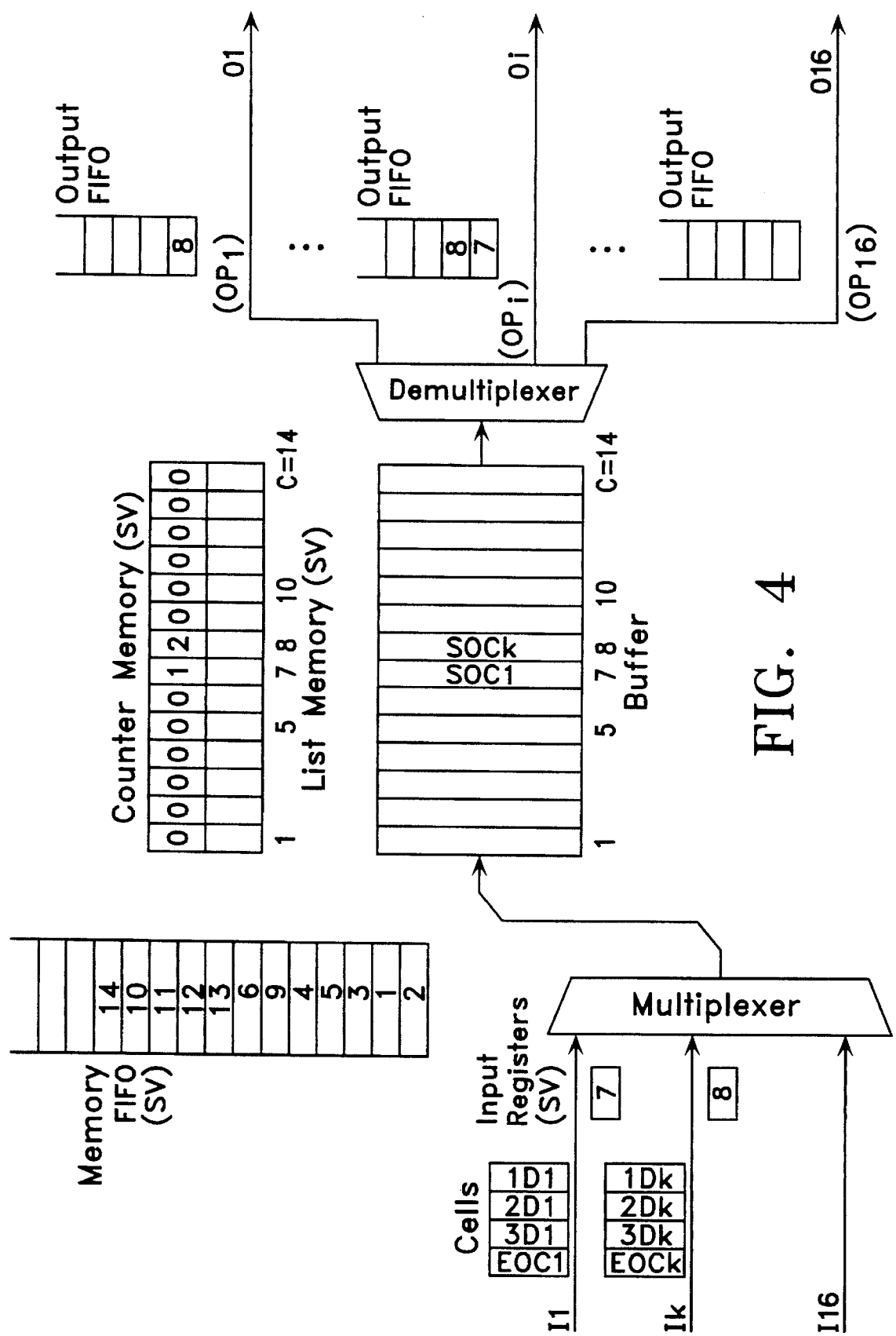

The switch element shown in FIG. 1 has p input units IP1, . . . , IPp each having one input line I1, . . . , Ip, a multiplexer Mx, a buffer PS having C individually addressable L-bit memory blocks, a demultiplexer Dx, q output units OP1, . . . , OPq, a memory management unit SV, and a routing block W. Preferably, p=q=16, i.e., the switch element has 16 input lines and 16 output lines. For C and L, numerical values of C=256 and L=50 are currently under discussion.

The input unit IP1 shows the internal structure of the input units in some more detail. The input line I1 runs to a synchronizer SYNC, whose output is connected to a serial-to-parallel converter SPW, and the output of the latter is connected via a unit ZAE for detecting starts and ends of cells to the input end of the multiplexer Mx. The unit ZAE is also connected to one input of the routing block W and to one input of the memory management unit SV.

The output unit OP1 shows details of the output units. The output end of the demultiplexer Dx is connected via a unit ZE for detecting ends of cells to a parallel-to-serial converter PSW, whose output is coupled to the output line 01. The output unit further includes an output FIFO OFF and an output register OR. The output FIFO OFF has its input connected to one output of the routing block W, and its output is coupled to the output register OR, which, in turn, is linked bidirectionally with the memory management unit SV.

In FIG. 1, the multiplexer Mx and a network of single lines provide the connection between the input units IP1, . . . , IPp and the central units, namely the buffer PS, the memory management unit SV, and the routing block W. The data stream is converted to an L-bit parallel format. Neither control and clock lines nor the power supply are shown. All these are things for which sufficient solutions are known to the person skilled in the art, i.e., solutions from which he can choose if he knows what information is to be exchanged where and when. In this respect, the same applies as for switch elements for synchronous systems. Such a switch element, which includes a bus system for interconnecting the units, is described in an article by J. M. Cotton et al, ITT 1240 Digital Exchange Digital Switching Network. Electrical Communications, Vol. 56, Number 2/3, 1981, pages 148–160. It should be pointed out that a bus system with a plurality of transmitters and one receiver is equivalent to a multiplexer. The same applies analagously to the output side.

The normal switching process will now be described with the aid of a greatly simplified example which is illustrated in FIGS. 2 to 10. In this simple example, the buffer PS has C=14 memory blocks, which are at first all empty. The memory management unit SV is shown by a table-like representation of its memories. The heart of the memory management unit SV is a list memory LL, which has one location for each of the C memory blocks of the buffer PS. This location has the same address as the associated memory block and can receive the address of another memory block. At first (FIG. 2) the list memory LL is empty. The memory management unit SV further includes a memory EFF for storing the addresses of unused memory blocks, which works on the FIFO (first-in-first out) principle and initially contains the addresses of all memory blocks of the buffer PS in a random sequence. The output FIF0s, of which OFF1, OFFi, and OFF16 are shown, are at first empty, too. Actually an "empty" location contains some kind of data, as usual. This may be a value which marks the location as empty, but it may also be a value from the previous use which is no longer valid. In the latter case, steps must be taken to ensure that this value will not be called for any more. The memory management unit SV of the present embodiment further includes C locations of a count memory CC, which can be addressed by the list memory LL. The count memory CC indicates to how many output units the contents of the associated memory block of the buffer PS still have to be outputted. The contents of all locations of the count memory CC are initially 0.

On each of the input lines I1 and Ik, one cell now arrives. No further cells arrive in this example. The synchronizers of the two input units IP1 and IPk, together with the respective serial-to-parallel converters, convert each of the cells into five blocks of equal length. Each of the first blocks SOC1 and SOCk begins with a start-of-cell label SOC. The last blocks EOC1 and EOCk contain an end-of-cell label EOC. The label EOC lies at an arbitrary point within the last block, namely where the cell arriving from outside actually ends. The synchronizer adds blanks to fill the blocks. The remainder of the first blocks, the second to fourth blocks, 1D1, 2D1, 3D1 and 1Dk, 2Dk, 3Dk, respectively, and the portions of the fifth blocks up to the EOC label contain the data of the cells.

The input units are cyclically interrogated by the multiplexer Mx. The units ZAE in the input units IP1 and IPk recognize by the SOC labels that information is present which has to be passed on. From the memory EFF, the address 7 is transferred as the address of an unused memory block into an input register IR1, and the first block SOC1 is stored in the buffer PS in memory block 7. At the same time, the SOC label goes to the routing block W and to the memory management unit SV. In the block W it is determined with the aid of the SOC label that this cell is destined for the output line i. In the output FIFO OFFi, address 7 is noted as the start address of a cell to be outputted by the output unit OPi. In the count memory, a "1" is noted in location 7. The condition shown in FIG. 3 has now been reached.

The next block to be transferred into the buffer PS is the block SOCk from the input unit IPk. The memory EFF indicates that this block is to be stored in the buffer in memory block 8. The routing block W determines from the SOC label that this cell is to be placed on both the output line 01 and the output line Oi. Address 8 is therefore stored both in the output FIFO OFF1 and in the output FIFO OFFi, in the latter in the second location behind the 7. The block SOCk itself is stored in the buffer PS in memory block 8, and in the count memory CC, "2" is entered into location 8. The "8" is stored in the input register IRk. The condition shown in FIG. 4 has now been reached.

Next, the block 1D1 is stored in the buffer PS in the next unused memory block, 2; in the count memory CC, a "1" is entered into location 2, and in the list memory, a "2" is entered into location 7. Address 7 was temporarily stored in IR1 as the address under which the preceding block of this cell was stored. The other blocks from the input units IP1 and IPk are stored in the same way.

Figure 5:
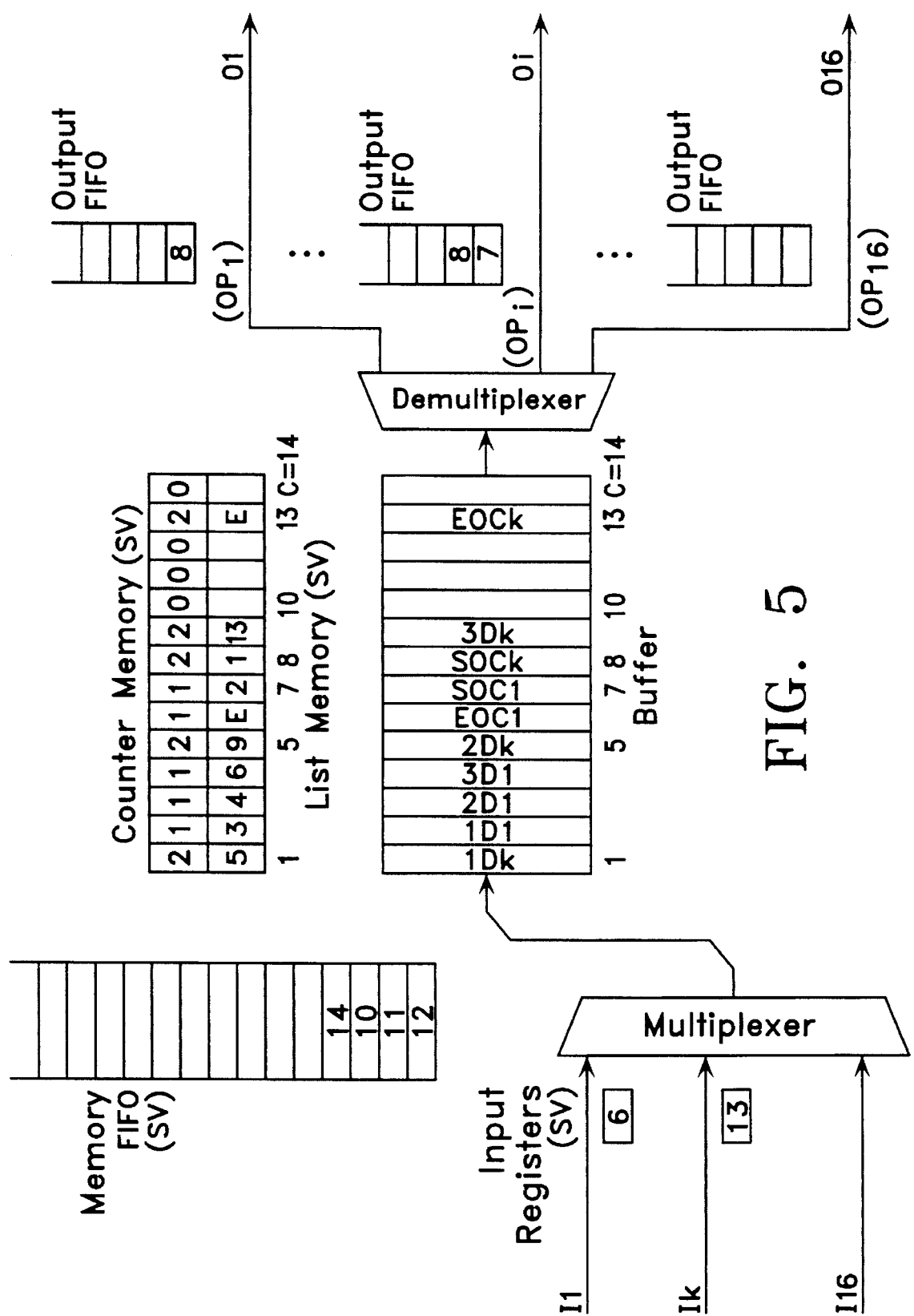
Figure 6:
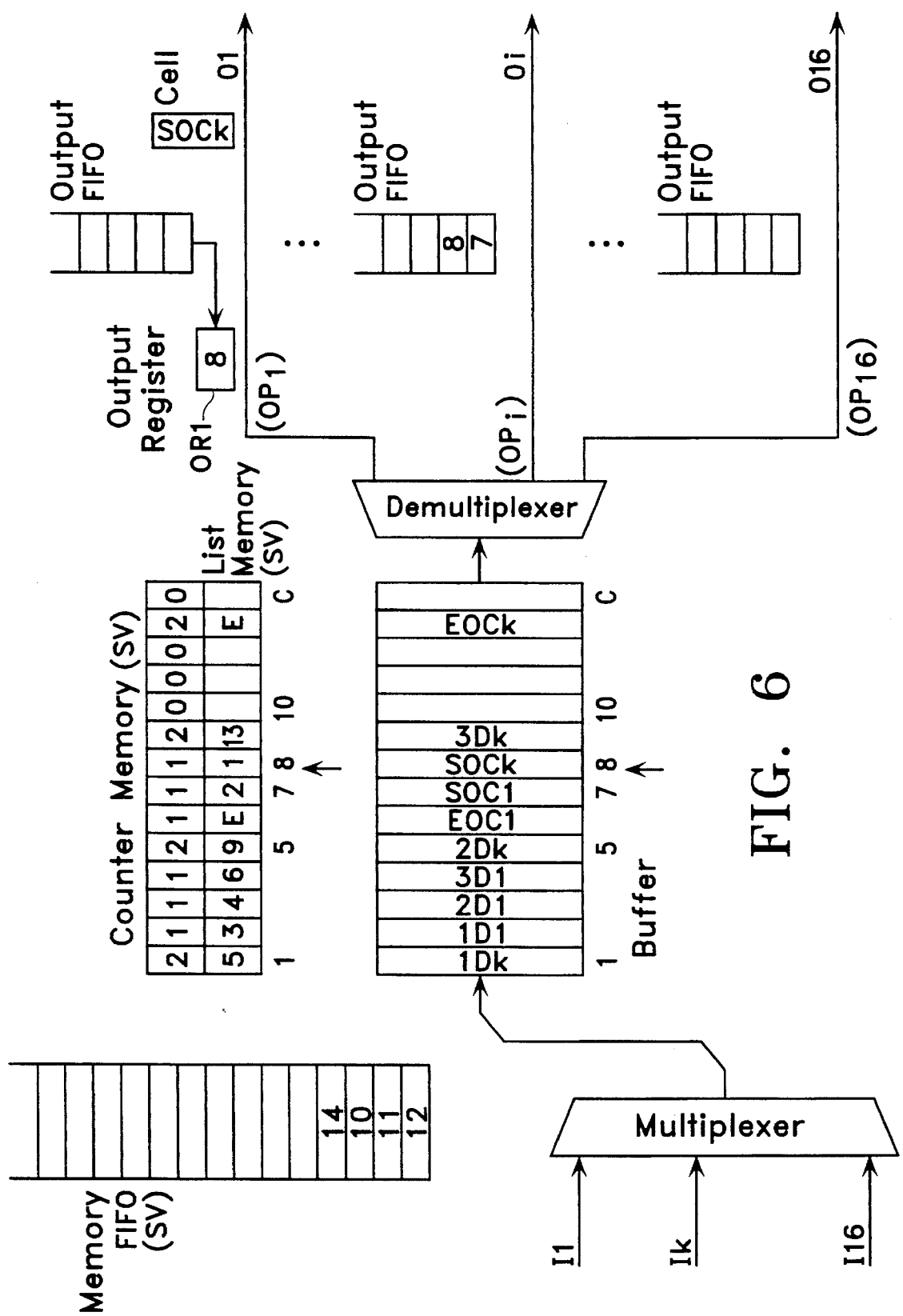

At the end of the input, shown in FIG. 5, the blocks of the cell received from I1 are stored in the memory blocks 7, 2, 3, 4, and 6 in this order, and the blocks of the cell received from Ik are stored in the memory blocks 8, 1, 5, 9, and 13 in this order. The memory EFF indicates only four unused memory blocks in the buffer PS. The list memory LL contains the above-mentioned address sequences, with a special character, here "E", entered instead of a link address for the respective last block.

The output of the cells, which is to follow the complete input, will now be described with the aid of FIGS. 6 to 10. Output is initiated from the output units; to this end, the output units are cyclically activated.

The output FIFO OFF1 indicates that a cell whose first block is stored in the buffer in memory block 8 is to be placed on the output line 01. Address 8 is transferred to the output register OR1 and applied to buffer PS, list memory LL, and count memory CC; the first block is outputted from PS, the link address "1" is transferred from LL to OR1, and the count memory is decremented from "2" to "1", cf. FIG. 6.

Figure 7:
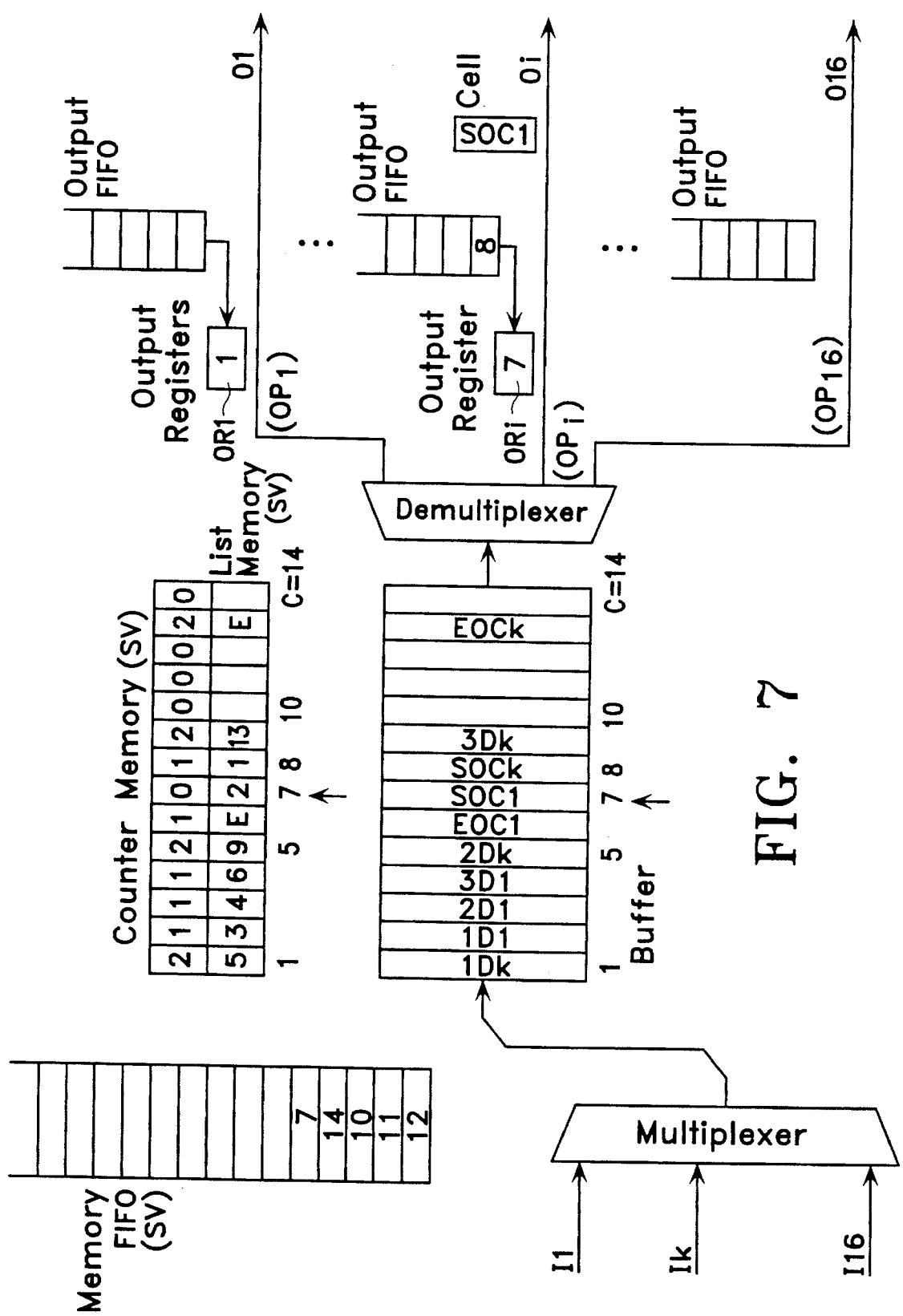

FIG. 7 shows the next output, which is initiated from OPi. The start address 7 is transferred from OFFi to ORi and applied to PS, LL, and CC; the first block is outputted from PS, the link address 2 is transferred to ORi, and CC is decremented from "1" to "0". This "0" indicates that the contents of block 7 in PS are no longer needed; this block is now free, and its address is returned to the memory EFF for storing the addresses of unused memory blocks.

Figure 8:
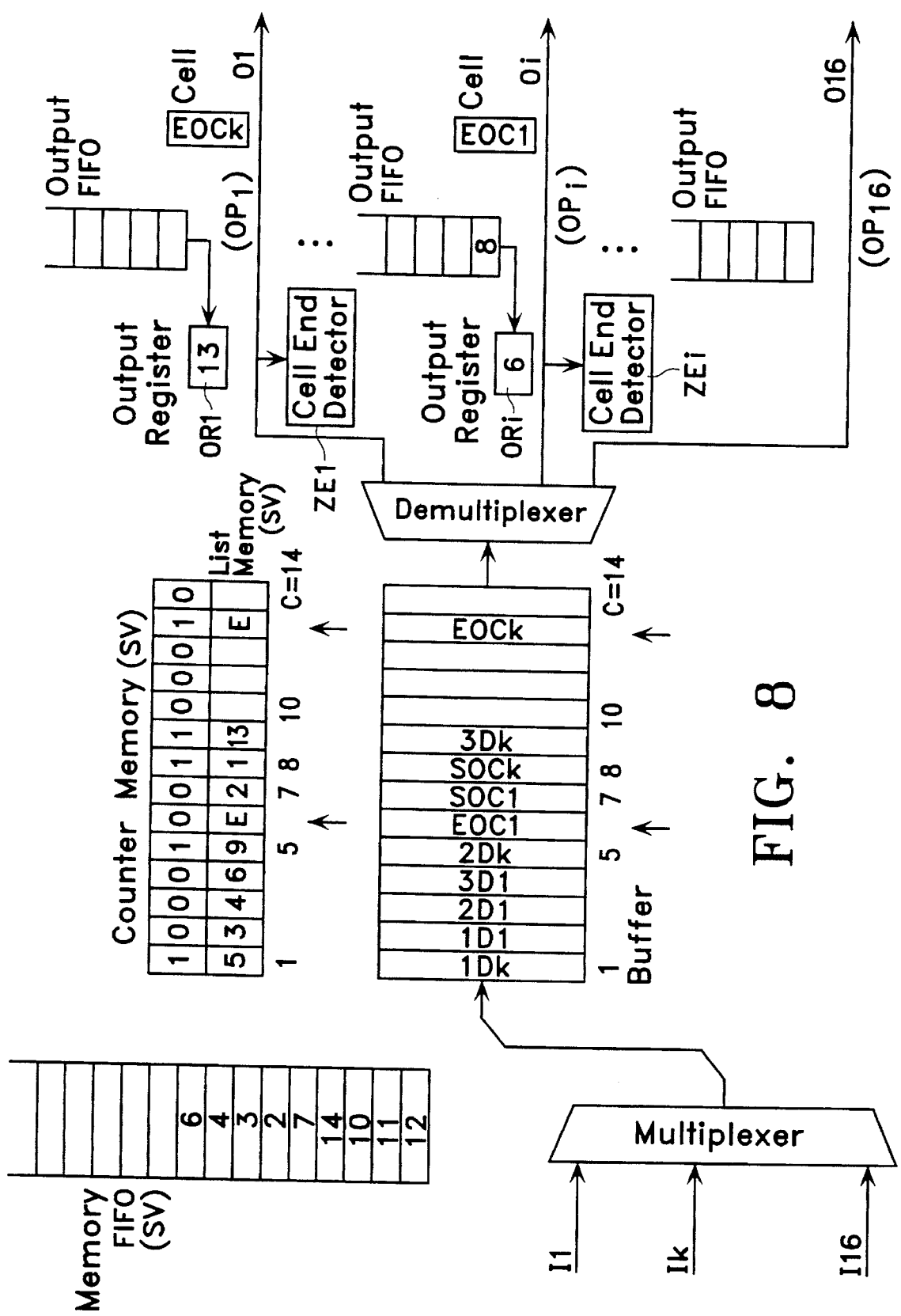
Figure 9:
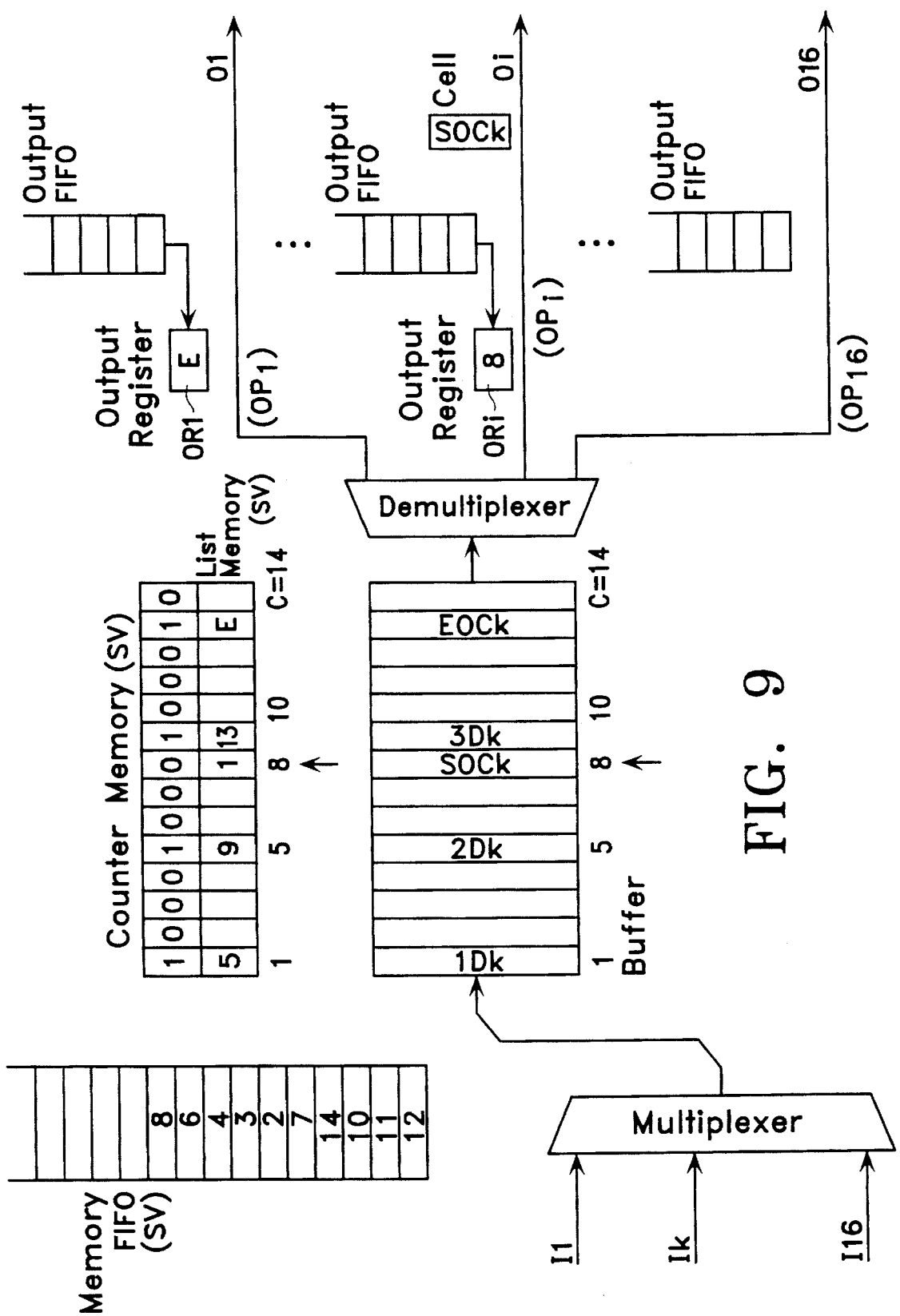
Figure 10:
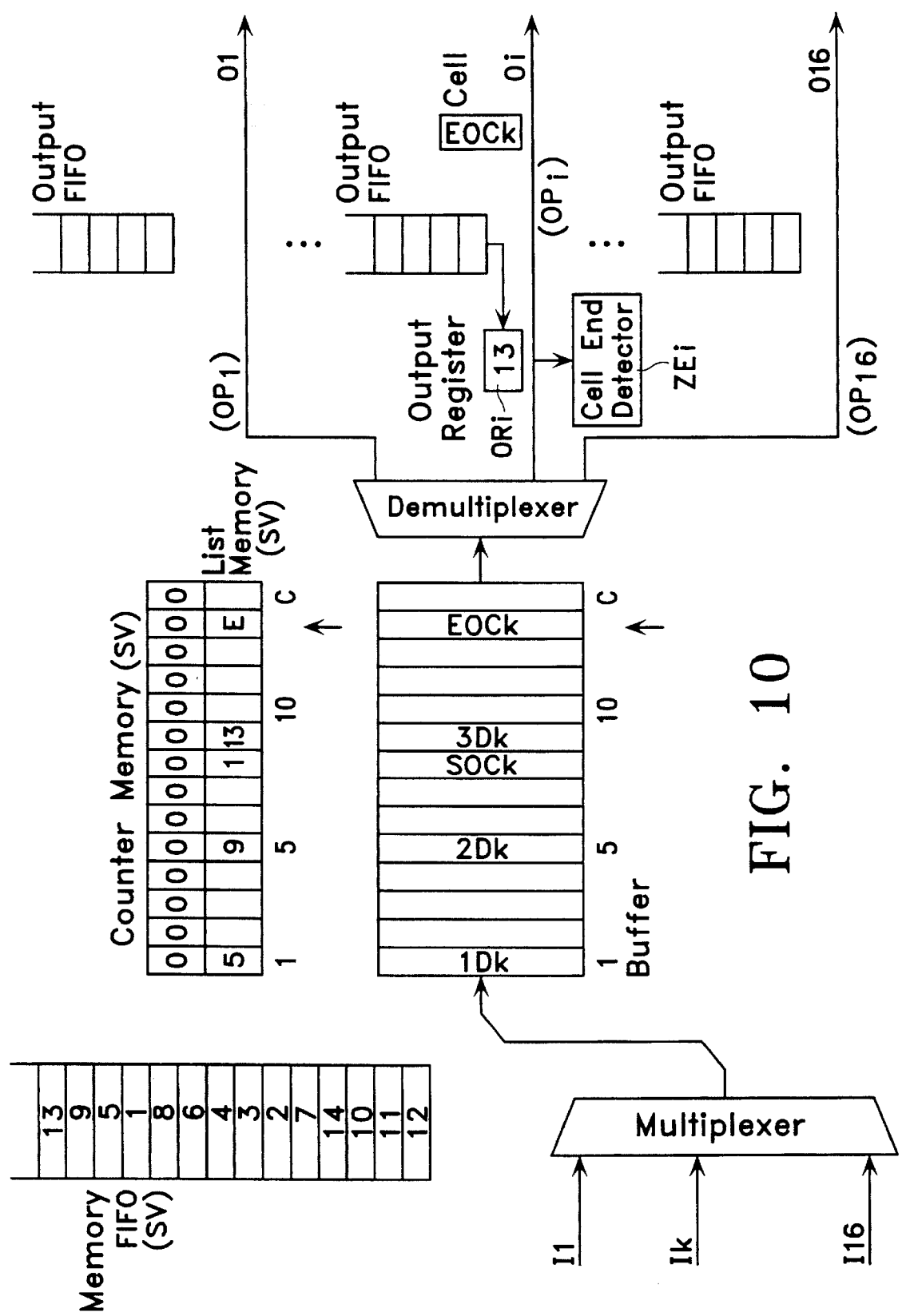

FIG. 8 shows the condition which results when one cell has been outputted to 01 and Oi each. The end of a cell is detected both by the units ZE1 and ZEi for detecting ends of cells and with the aid of the contents of the output registers OR1 and ORi. Units not shown cause dummy blocks to be transmitted. OFFi indicates, however, that a further cell has to be transmitted from the output unit OPi, and that the first block of this cell is stored in PS in memory block 8. The output of the cell begins with the condition in FIG. 9 and ends with the condition in FIG. 10.

All blocks have now been outputted, buffer PS and list memory LL are free, all locations of the count memory CC contain a "0", the memory EFF again contains the addresses of all memory blocks of PS, even though in a different order, and dummy blocks are being transmitted over all output lines.

In reality, inputs and outputs need not necessaryily be separated in time as described but may occur simultaneously. The buffer PS is designed as a dual-port RAM, so that inputs and outputs can access it independently of each other. This means in particular that the first blocks of a cell can be read out before the last blocks have been written in. This minimizes the delay of the cells and the holding time of the buffer PS.

Figure 11:
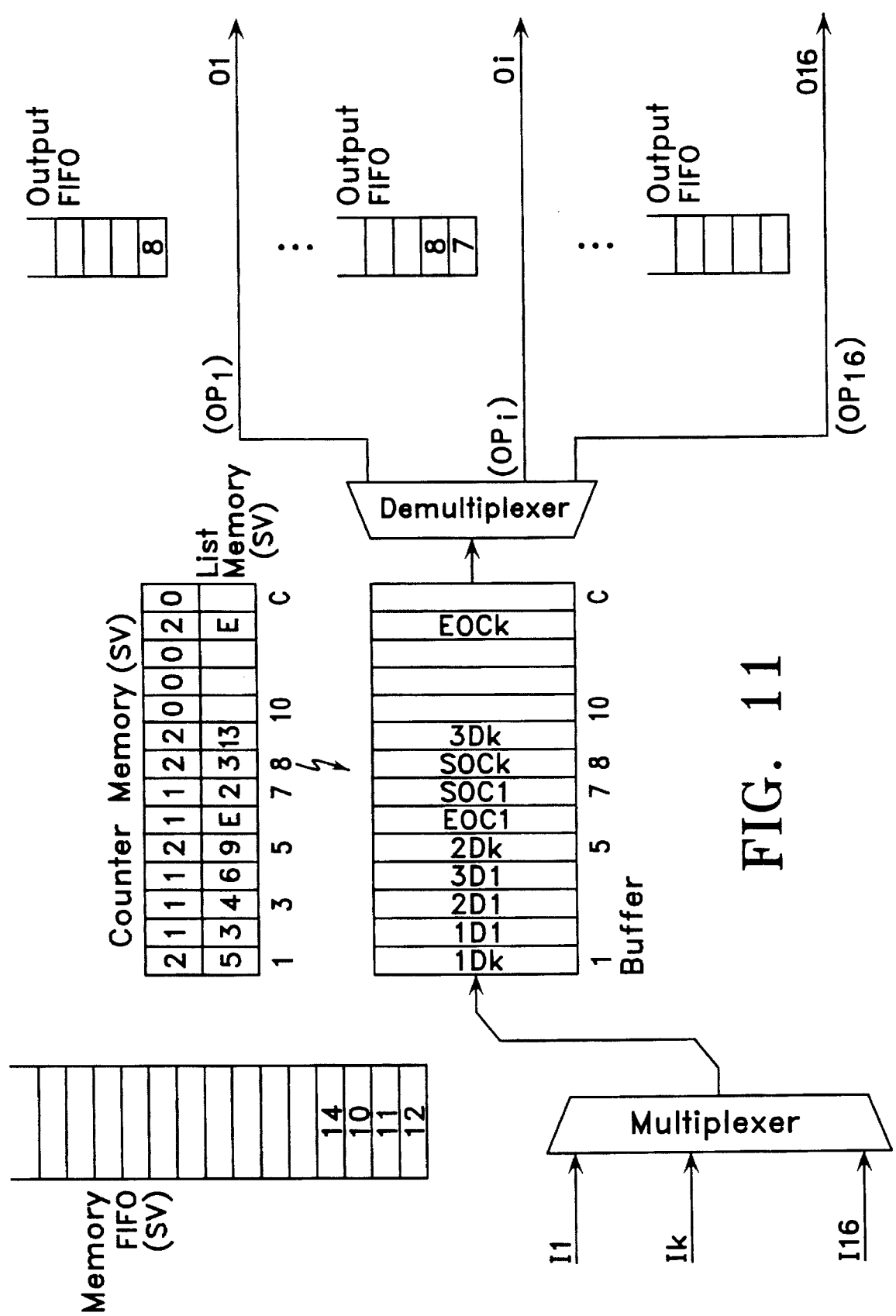
FIG. 11 shows the occurrence of an error.
Figure 12:
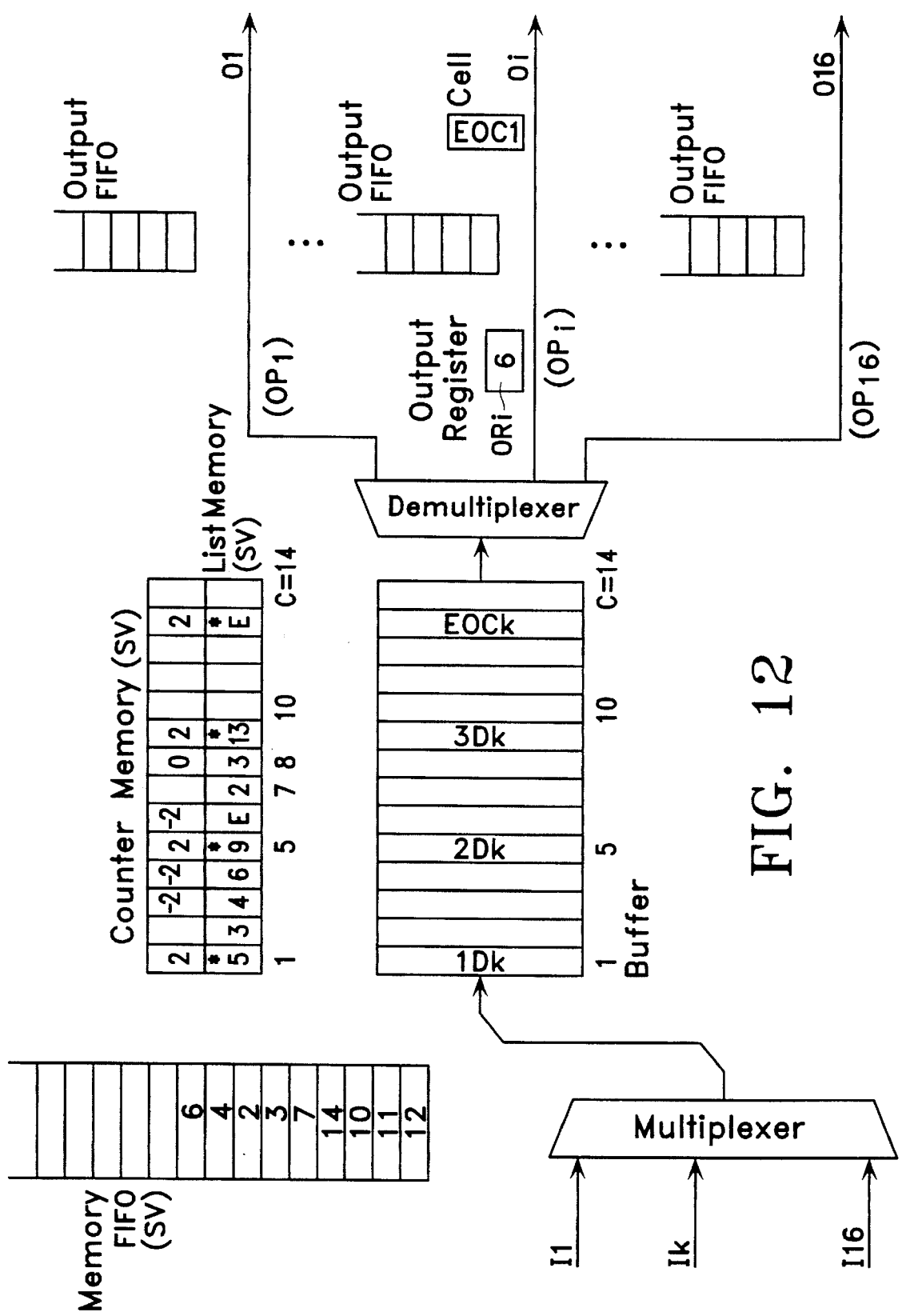
FIG. 12 shows the consequences of the error.

FIG. 11 takes up the situation as it presents itself at the end of the input in FIG. 5. Now, however, it is assumed that because of an error, the link address "1" in the location 8 has been changed to "3" (lightning flash in FIG. 11). This results in various additional errors, which are shown in FIG. 12. Firstly, the cell to which the block in location 8 belongs is outputted falsely, namely twice. Secondly, the entry in the count memory for the falsely outputted blocks becomes negative. However, since only the content "0" has a consequential effect, namely the entry of free memory blocks into the memory EFF, this is of no significance. The blocks with the addresses 1, 5, 9 and 13, which actually should follow the block 8, are not outputted at all (marked with an asterisk in FIG. 12). As a result, they cannot be labelled as free. These blocks are blocked for the remaining time of operation. Since the aim is to maintain uninterrupted service and since errors cannot be completely excluded, such a memory will be increasingly blocked unless additional steps are taken.

The starting point for the solution to this problem is the recognition that during error-free operation, the residence time of a cell in the switch element is limited. Data continuously flow off on each output line. The transmission time for each cell is limited. Because of the output FIFOs OFF, the number of cells that can be buffered for each output is limited, too. Thus, a time can be specified after which a just received cell must have been outputted at the latest. The fact that this time possibly cannot be exactly defined but can only be determined from statistical considerations is irrelevant. Hence, the fundamental idea of the solution to this problem is that all entries that are older than this maximum time are regarded as erroneous and are erased.

Figure 13:
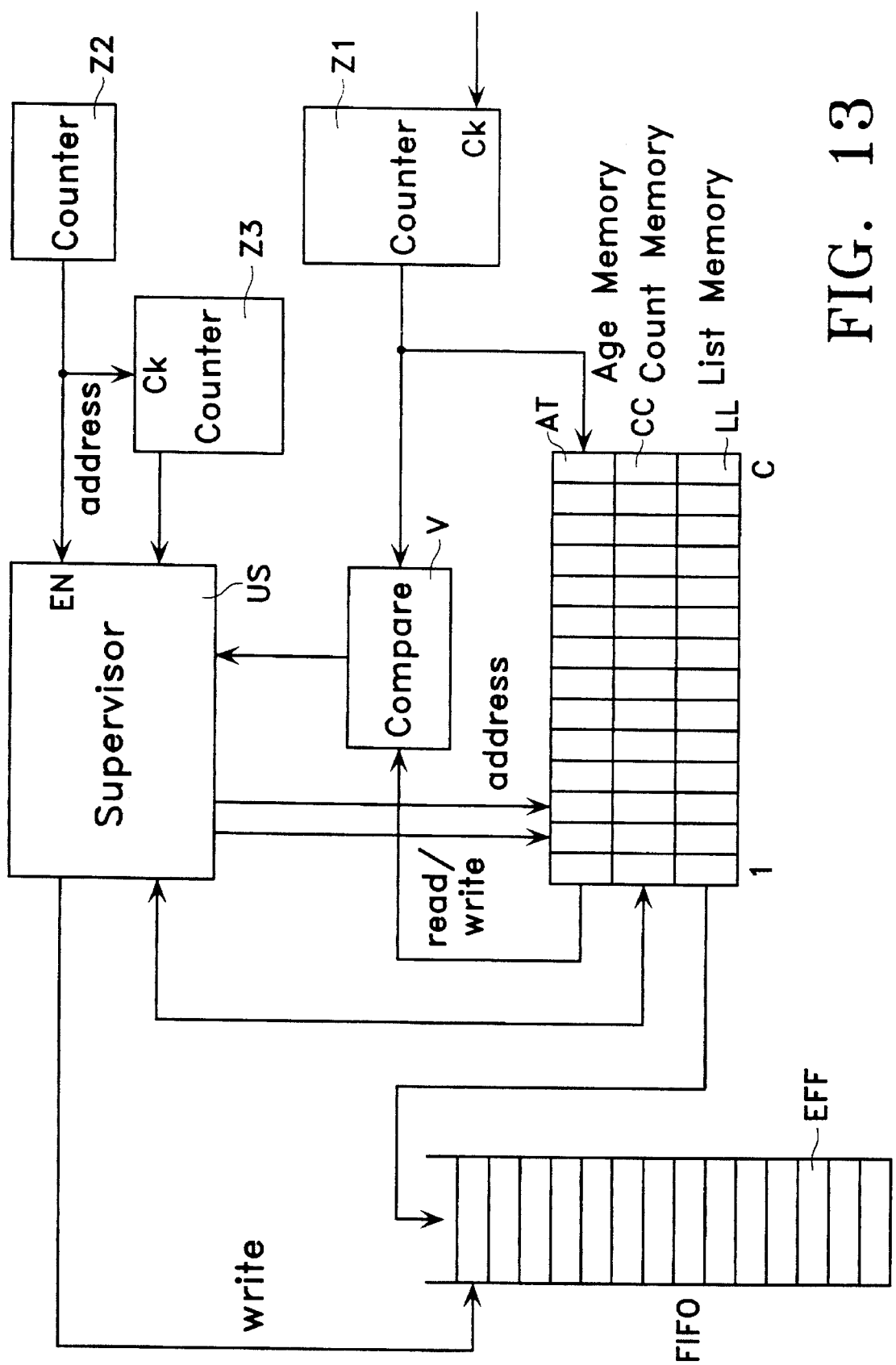
FIG. 13 shows a circuit for eliminating such errors.

This solution is implemented by the circuit of FIG. 13. Besides the count memory CC, an age memory AT is associated with the list memory LL. The circuit further includes a supervisory circuit US, a comparator V, a first counter Z1, a second counter Z2, and a third counter Z3. The supervisory circuit US can initiate inputs into the age memory AT and the count memory CC, read the contents of the age memory and the count memory, and enter free memory blocks into the memory EFF. The counter Z1 counts at intervals equal to the time required to transmit a cell of average length. At a count corresponding to twice the residence time regarded as a maximum, the counter Z1 is reset. If a block is entered into the buffer PS, the supervisory circuit US causes the instantaneous count of Z1 to be written into the age memory AT by applying the associated address and a write pulse to AT.

A further embodiment will now be described with the aid of FIGS. 14 to 16.

When using a memory area, particularly a linked-list memory—i.e., a memory with linked address lists—, it is necessary to find out the addresses of free memory locations. The search for addresses of free memory locations of a memory area is made by means of an arbiter logic which searches a supervisory memory for free memory locations assigned to addresses of the memory area. Such a supervisory memory, also referred to as "Time Supervision Field", is illustrated in FIG. 14, which shows a 2-bit field. If one or two bits of a memory are logic "1", the associated location of the memory area is occupied.

The arbiter logic searches through the 2-bit field, starting, for example, with the least significant address. As soon as an address of a free location is found, this address is read out by the arbiter logic and marked as occupied by means of a SET signal. The address of the memory area can now be made available for a processing operation.

If a new address is looked for, the arbiter logic will find the next free memory location in the supervisory memory very quickly, because occupied locations were marked by means of the SET signal.

If a free location is found in the memory area, the two associated bits of the address of the supervisory memory are set to "0".

It is now possible that, because of a malfunction, individual bits of the supervisory memory are "1", so that the associated address of the memory area will be interpreted as occupied. This could result in the Supervision Field being fully occupied in the course of time, so that no free addresses of the memory area could be found any more. To avoid any resulting blocking of the associated circuit, a self-healing function is implemented. To this end, the rows of the supervisory memory, i.e., the upper and lower rows of the 2-bit field of FIG. 14, are set to "0" by a supervisory circuit, the so-called Time Supervision Control. For example, as shown in FIG. 15A, first the lower row of the 2-bit field is set to "0", and after a predetermined time T, the upper row of this memory is also set to "0", as shown in FIG. 15B. The time T must be chosen so that the time between two reset pulses is longer than the period for which the memory location must be made available to the memory area in the worst case.

This procedure ensures that the addresses of the supervisory memory are regularly reset to "0", so that free addresses of the memory area are available at regular intervals even if, due to an error, the addresses are indicated as occupied.

Figures 14, 15A, 15B, 16:
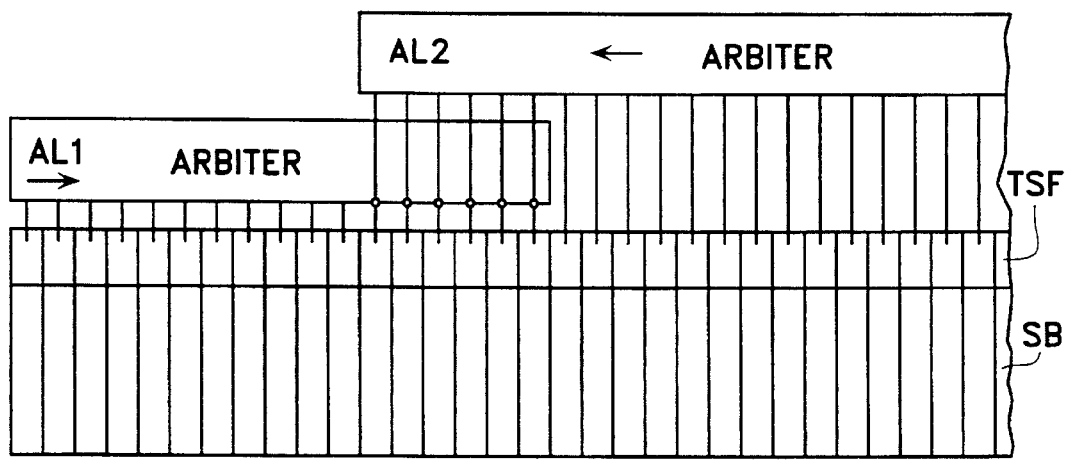
FIG. 14 shows a supervisory memory, a so-called Time Supervision Field, of an arbiter logic.
FIGS. 15A and 15B show the row-by-row resetting of the supervisory memory for implementing a self-healing function of the arbiter logic.
FIG. 16 shows two interconnected arbiter logics together with a common memory area.

The supervisory circuit, the Time Supervision Control, can also be used to initialize the search logic by setting all rows of a supervisory memory, i.e., the two rows of the 2-bit field of FIG. 14, to "0". This results in an especially simple initialization of the circuit.

From the foregoing it follows that the addresses of the memory area can be repeatedly made available without the need for a complicated and costly supervisory device as is known from the prior art.

It is possible to couple two or more search logics of this kind together, such that a grading or graded interconnection of the logics is obtained. One arbiter logic may be associated with two or more subordinate arbiter logics and determine which of these logics indicate free addresses. The subordinate arbiter logics may be directly assigned to memory areas. It is also possible, however, to assign further subordinate arbiter logics to these subordinate arbiter logics. In this way, a large number of memory locations of a memory area can be managed by relatively few arbiter logics.

With a specific interconnection as shown in FIG. 16, memory areas of variable size can be managed.

In FIG. 16, a memory area SB is associated with two arbiter logics AL1 and AL2. Associated with both arbiter logics is a common supervisory memory, a Time Supervision Field TSF, with individual address fields of the Time Supervision Field assigned both to the first arbiter logic AL1 and to the second arbiter logic AL2.

In such a circuit, the searches for free addresses in the individual arbiter logics must be performed in opposite directions. The search for free addresses in the first arbiter logic AL1, for example, is made from left to right, which is indicated by an arrow. The search in the second arbiter logic AL2 is made in the opposite direction, which is also indicated by an arrow.

In specific applications of this circuit, it may be advantageous to assign the addresses of the memory area SB from 1 to v to a first function and the addresses from v+1 to c to a second function. These ranges need not be fixed provided that their limits lie in the overlap region of the two arbiter logics AL1 and AL2. When searching for free addresses, the arbiter logics each begin at an edge region of the memory area SB to look for free addresses. It is quite possible that no problems arise if the addresses of free memory locations of the memory area lie in the field in which the arbiter logics do not overlap. As soon as a free address in the overlap region is read out by one of the arbiter logics, this can be detected by a supervisory logic, which then outputs the respective address of the free memory location in the memory area SB.

All this results in a considerable simplification of the search logic for finding the address of a free memory location in a memory area. The associated supervisory memory may form part of the memory area associated with the search logic, so that a regular design of the overall circuit is obtained. As the need for the complex supervisory circuits required with FIFO memories is eliminated, chip area can be saved. During start-up of the search logic, simple system initialization is possible by the supervisory circuit, the Time Supervision Control. Errors occurring during a search routine are eliminated by the self-healing function described. Complicated search routines can be dispensed with.

If different arbiter logics are interconnected, large memory areas can be covered. If the arbiter logics overlap as shown in FIG. 16, variable memory areas can be provided, so that optimum memory utilization can be achieved.

The search logic for finding the address of a free memory location in a memory area, which was explained with the aid of FIGS. 14 to 16, can also be used to find free processors in a multiprocessor system.

In that case, the individual processors are associated with the supervisory memory. The arbiter logic now searches through the supervisory memory for free processors so as to be able to make the latter available for, e.g., the processing of program steps. The addresses of the processors made available are labeled as occupied in the supervisory memory. During the next search for a free processor, the arbiter logic can very easily determine the occupied processors and thus find free processors more quickly.

It is readily apparent that free channels of a data communication system can be found with the aid of the circuit described. To this end, the channels of the data communication system are assigned to the supervisory memory. In the manner described above, the arbiter logic finds free channels in the supervisory memory and can make these available for the transmission of data. Such free channels are marked in the supervisory memory and are interpreted as occupied during the next search process. In this way, free channels can be found quickly and simply. In this application, too, the supervisory memory, which is associated with the processors or channels, can be reset with the aid of the above-explained Time Supervision Control. In so doing, erroneous bits are set "off" and the supervisory memory is prevented from marking free units as occupied.

Another possibility of implementing the same fundamental idea results if a counter or one-shot multivibrator is associated with each unit. By setting the counter to a maximum value or by setting the one-shot multivibrator, the beginning of a period of time can be determined. By a clock signal, the counter is reset to zero step by step. A unit with a count of zero or with a reset one-shot multivibrator is then regarded as free. Intentional resetting of the counter or the one-shot multivibrator upon release of the associated unit is not excluded and quite practical.

I claim:

1. Method of dedicating a data unit from a plurality of such data units for a one-time specific use in a digital communication system, comprising the steps:

providing an electronic memory whose contents indicate which of said data units have previously been dedicated for a respective said one-time specific use and have not yet been freed for any other use and are therefor unavailable, determining when each unavailable said data unit was last dedicated to the corresponding said one-time specific use, updating said contents to indicate as free for other uses, each unavailable said unit which was last dedicated to a respective specific use longer than a predetermined time ago, using said contents to identify a free unit, and dedicating said free unit to said one-time specific use, wherein each said one-time specific use is receiving storing and transmitting a single block of data.

2. A method as claimed in claim 1, further comprising the steps of determining when each data unit is no longer required for the respective one-time specific use for which it was dedicated, and indicating said each data unit as available for other uses as soon as it has been determined to be no longer required for said respective one-time specific use.

3. A method as claimed in claim 1, wherein when a particular available data unit is dedicated to a respective one-time specific use, information on an occupancy state of said particular data unit is stored in a respective location of said electronic memory associated with said particular data unit.

4. A method as claimed in claim 3, wherein the information on the occupancy state is information on the time at which the data unit was dedicated to said respective one-time specific use, and said step of determining when each said data unit was last dedicated to said respective specific use is performed by regularly checking said occupancy state information.

5. Method of making available a memory block for receiving, storing and transmitting a single data packet, from a plurality of such memory blocks in a digital communication system, comprising the steps:

providing an electronic FIFO memory whose contents indicate which of said memory blocks are currently free for general use, determining when each of said memory blocks was dedicated to a respective specific one-time use, updating said contents to indicate as free for general use each memory block which was dedicated to a respective specific one-time use longer than a predetermined time ago, by storing a respective address identifying that memory block in the FIFO memory, and subsequently dedicating each thus freed memory block to another said specific use by outputting said respective address from the FIFO memory.

6. Method of making available a data unit for receiving storing and transmitting a data packet, from a plurality of such data units in a digital communication system, comprising the steps:

providing an electronic memory whose contents indicate which of said data units have previously been dedicated for a respective specific one-time use and have not yet been freed for any other use, different locations of said electronic memory being associated with different said data units, each said memory location containing at least two one-bit positions which can be set jointly and reset separately, whenever a particular available data unit is dedicated to a respective specific one-time use, setting all said one-bit positions of the associated memory location, thereby determining when each said data unit was dedicated to a respective specific one-time use, periodically generating reset pulses at predetermined time intervals, applying the reset pulses sequentially to the individual said one-bit positions within a single said memory location but simultaneously at all said memory locations, and making available for dedication to other specific uses, those data units for which all the associated bit positions are reset whereby each data unit which was dedicated to a respective specific one-time use longer than a predetermined multiple of said predetermined time interval is freed for dedication to another specific use.

7. A method as claimed in claim 1, wherein each unit has a circuit element associated therewith for signalling the expiration of a predetermined time.

8. Circuit arrangement for managing a plurality of data packet transmission units such that a free transmission unit may be made available for a one-time specific use in a digital communication system for transmitting a single block of data, wherein said circuit arrangement comprises an electronic memory having a plurality of locations respectively associated with said plurality of transmission units, and indicating means associated with each of said memory locations for indicating whether the associated said transmission unit was made available longer than a predetermined time ago.

9. A circuit arrangement as claimed in claim 8, wherein each said indicating means is included within its associated said memory location.

10. A circuit arrangement as claimed in claim 8, wherein each transmission unit further comprises means for signalling the expiration of said predetermined time.

11. A circuit arrangement as claimed in claim 8, wherein said plurality of data packet transmission units is a buffer having a plurality of memory blocks.

12. A circuit arrangement as claimed in claim 11, wherein each said means is included within its associated said memory location, the buffer has an associated age memory, and each memory block of the buffer is associated with one location of said age memory.

13. A circuit arrangement as claimed in claim 12, wherein simultaneously with the entry of information into a memory block of the buffer, information on the time of entry is entered into the associated location of the age memory, all information in the age memory is regularly checked, and a memory block is marked as free if the entry was made longer than said predetermined time ago.

14. Circuit arrangement for managing a buffer having a plurality of memory blocks such that a memory block dedicated to a respective specific one-time use longer than a predetermined time ago may be made available for subsequent dedication to other specific uses, wherein said circuit arrangement comprises an electronic age memory having a plurality of memory locations each respectively associated with a respective one of said plurality of memory blocks and each including at least two one-bit memory positions, said one-bit memory positions can be set jointly and reset separately, each time one of said memory blocks is dedicated to any said specific use, all said one-bit memory positions memory of the respective memory location are set, reset pulses are periodically generated at intervals determined by said predetermined time, the reset pulses sequentially act on the one-bit memory positions of each memory location but simultaneously at all said memory locations, and those memory blocks whose associated one-bit memory positions are all reset are regarded as free and may be dedicated to other respective specific uses.

15. A circuit arrangement as claimed in claim 8, connected with a second, like circuit arrangement such that at least a part of the plurality of data packet transmission units of each of the circuit arrangements is managed by both said circuit arrangements.

16. Switch element for a packetized information transmission system, comprising p input units, q output units, a buffer having an input, an output and C memory blocks each capable of containing L bits, a multiplexer for connecting any of the p input units to the input of the buffer, a demultiplexer for connecting the output of the buffer to any of the g output units, and a list memory having C locations each capable of containing one address of the buffer, with each memory block in the buffer assigned to that location in the list memory which has the same address, wherein each packet arriving at any of the input units is divided into L-bit blocks, each block is written into a free memory block of the buffer, for each memory block of the buffer, the address of that memory block is stored in the list memory into which the next block of the same packet is written, each of the C locations of the list memory has a respective second location with the same address associated therewith for storing information from which it can be determined how long ago an entry into the associated memory block of the buffer last took place, such a determination is made regularly, and each memory block still marked as occupied after a predetermined time is labeled as free.

17. A switch element as claimed in claim 16, wherein a counter is provided which is incremented after each period of time equal to the period required to output a packet of average length, when a block is written into a memory block of the buffer, the count of the counter is entered into the associated second location, the contents of all second locations are regularly subtracted from the count of the counter, and the associated memory block of the buffer is labeled as free when the difference has reached a predetermined value, if said memory block has not yet been labeled as free.

* * * * *